United States Patent [19]

Engelmore

[11] Patent Number: 4,533,796
[45] Date of Patent: Aug. 6, 1985

[54] ROTATABLE ELECTRICAL CONNECTOR FOR TELEPHONE CORD

[76] Inventor: Anthony R. Engelmore, 14001 Harbour Pl., Prospect, Ky. 40059

[21] Appl. No.: 575,102

[22] Filed: Jan. 30, 1984

[51] Int. Cl.³ .............................................. H01R 35/00
[52] U.S. Cl. .................................... 179/186; 339/8 R
[58] Field of Search ............ 179/186, 184; 339/6 RL, 339/8 R, 8 P, 8 PB, 5 P, 5 M

[56]  References Cited

U.S. PATENT DOCUMENTS

| | | | |
|---|---|---|---|
| 1,894,187 | 1/1933 | McGregor | 339/8 PB |
| 2,414,957 | 1/1947 | Larraburre | 339/8 PB |
| 2,941,177 | 6/1960 | Merritt | 339/8 PB |
| 3,123,421 | 3/1964 | Phillips | 339/8 PB |
| 3,387,250 | 6/1968 | Bjorn | 339/8 PB |
| 3,437,976 | 4/1969 | Welson | 339/8 R |

FOREIGN PATENT DOCUMENTS 917275 12/1972 Canada ................ 339/8 R

*Primary Examiner*—Gene Z. Rubinson
*Assistant Examiner*—L. C. Schroeder
*Attorney, Agent, or Firm*—Richard L. Caslin

[57] ABSTRACT

This low friction rotatable electrical connector is for use with coiled telephone cords to prevent the cord from becoming twisted and knotted-up. This connector is generally of insulating material formed by a hollow inner cylindrical member telescoped within a hollow outer cylindrical member. A pair of ball bearing members support the outer member on the inner member for rotation about a central longitudinal axis. The inner member has a single longitudinal split in one side for receiving a plurality of continuous conductive rings on the outer surface when the inner member is squeezed, and a first set of flexible insulated conductors extend through the interior of the inner member and then through this split for connection to these rings. A plurality of apertures are formed in the wall of the outer member in alignment with the conductive rings, and these apertures contain spring-biased balls in rolling contact with the rings. The exterior of the outer member supports a plurality of split conductive rings that are in alignment with the continuous rings of the inner member as well as with certain of the spring-biased balls so as to maintain good electrical continuity between the innermost continuous rings and the outermost split rings. A second set of flexible insulated conductors are joined to these split rings at one end and to a male electrical plug at the outermost end of the outer member. An insulated sleeve is fitted over the outer member, and it may include a hollow ball and socket joint that supports the male plug when the connector is fixedly mounted to the telephone base or hand set.

13 Claims, 6 Drawing Figures

ROTATABLE ELECTRICAL CONNECTOR FOR TELEPHONE CORD

BACKGROUND OF THE INVENTION

1. Field of the Invention:

This invention relates to the art of rotatable electrical connectors for use with flexible electric cables, and particularly for use with coiled cords that are widely used today on telephone receivers for connecting the handset to the telephone base. One of the advantages of coiled cords is that they are able to stretch for convenient use, while they retract into a compact length when not in use. This rotatable connector of the present invention is mainly for use with light-weight, light duty telephone cords rather than high voltage, high current electrical cable systems.

2. Description of the Prior Art:

A thorough search of the prior art was made, and only one patent was found relating to rotatable electrical connectors for coiled cords of telephone receivers. Most, if not all, of the prior art described heavy-duty commercial or industrial electrical connectors.

The Larrabure U.S. Pat. No. 2,414,957 describes a swivel connector for electric cables and cords for electric lamps, irons, vacuum cleaners and telephone sets. One end of the connector comprises a turning head that is shown fixed to a telephone handset. The main connector body has a closed end and a central socket or bore. The turning head has a ball bearing raceway with contacts with the adjacent rim portion of the body. The internal electrical conductors comprise a central rod and two concentric insulated tubes, with a grooved roller on the innermost end of each conductor. The main body has a plurality of radial, spring-biased ball contacts, each cooperating with a grooved roller. These spring-biased ball contacts are each provided with a wire conductor external of the main body, and cooperating with a tubular loop member.

The Mohr U.S. Pat. No. 3,195,094 relates to an electric cable coupling comprising mutually concentric, rotatable units that are capable of transmitting electrical current therethrough. Each electrical circuit has an internal ring member surrounded by a plurality of cylindrical rollers which are confined by an external ring member, and this unit is held together by split rings or helical springs. This design appears to have an excessive amount of friction to restrain an easy turning action between the movable parts.

The Norwegian Pat. No. 106,382, issued in 1965, appears to be derived from the above-cited Mohr patent, or vice versa.

The German Pat. No. 1,152,459 describes a cable connector with mutually concentric and rotatable parts for poly-phase current in which a series of ball bearings is provided inside an insulating housing. These ball bearings are under spring pressure, and they carry the electrical current. An internal tube is provided which holds a compact bundle of conductors that reach inside the insulating housing. The number of conductors corresponds to the number of electrical phases.

The Wendell et al U.S. Pat. No. 3,599,165 describes an electrical coupling device providing a series of continuous, unbroken, unsliding electrical connections between two relatively rotatable members over a limited angular displacement. There is a spiral strip connector that is made of thin material having a relatively low spring constant, that is capable of cyclic operation for a sufficient large number of rotative displacements as desired without excessive fatigue and rupture.

The Hayward et al U.S. Pat. No. 3,847,463 describes a cable connector for electrically connecting a coaxial cable to a fixed device, such as a coupler or amplifier, for use in a cable antenna television system CATV which is adapted to accommodate drop leads to individual subscribers' television sets.

The Charles et al U.S. Pat. No. 3,972,577 describes rotating electrical contacts in a device that is intended to be used on apparatus submerged underwater at great depth where it would be subjected to a high hydrostatic pressure. One example of such a device would be a rotary antenna of panoramic sonars intended to operate at great depth. This device also must be water-tight. This patent uses mercury or an alloy of gallium and indium as the conductive liquid.

The British Pat. No. 331,997 describes swivel connections for electric cables using ball bearing rings. One metal ring has spring whip contacts that are adapted to press lightly on the face of the opposite ring and provide continuous electric contact therebetween. Apparently, the ball race is not an electrical conductor. There is a ball and socket joint between the spindle of one member and the spindle of opposite member.

OBJECTS OF THE PRESENT INVENTION

The principal object of the present invention is to provide a low friction rotatable electrical connector for use with telephone cords so as to prevent the cord from becoming twisted and knotted-up.

A further object of the present invention is to provide a connector of the class described with a hollow inner cylindrical member telescoped within a hollow outer cylindrical member with a novel system of conductive rings on the inner and outer members for maintaining electrical continuity through the connector.

A further object of the present invention is to provide a rotatable electrical connector of the class described with a low friction rolling contact between a pair of conductive rings for each circuit through the connector.

A further object of the present invention is to provide a connector of the class described with a ball and socket joint supporting one of the electrical terminal means at one end of the connector.

SUMMARY OF THE INVENTION

The present invention provides a low friction rotatable electrical connector for use with telephone cords where the connector is mainly of insulating material having a hollow inner cylindrical member telescoped within a hollow outer cylindrical member. The inner member is provided with low friction bearing means for supporting the outer member thereon for rotation about the central longitudinal axis of the connector. Electrical terminals are formed at the opposite ends of this connector for joining the connector to electric circuit means. A plurality of continuous conductive rings are mounted on the exterior of the inner member, and flexible insulated conductors are fed through the center of the inner member for joining with these conductive rings. A plurality of split conductive rings are mounted on the exterior of the outer member to be in alignment with the continuous rings. Apertures are formed in the wall of the outer member for receiving spring-biased balls that make electrical connection between the related continuous ring and the split conductive ring for maintaining the continuity of the circuit through the connector. These split rings are furnished with flexible insulated conductors that extend out the other end of the connector. An insulated sleeve is fitted over the outer member and held thereon.

BRIEF DESCRIPTION OF THE DRAWINGS

This invention will be better understood from the following description taken in conjunction with the accompanying drawings and its scope will be pointed out in the appended claims.

FIG. is a top perspective view of a standard telephone set provided with a coiled telephone cord between the base and the handset, where the low friction rotatable electrical connector of the present invention is interposed between one end of the coiled telephone cord and the handset.

DESCRIPTION OF THE PREFERRED EMBODIMENTS

Figure 1:
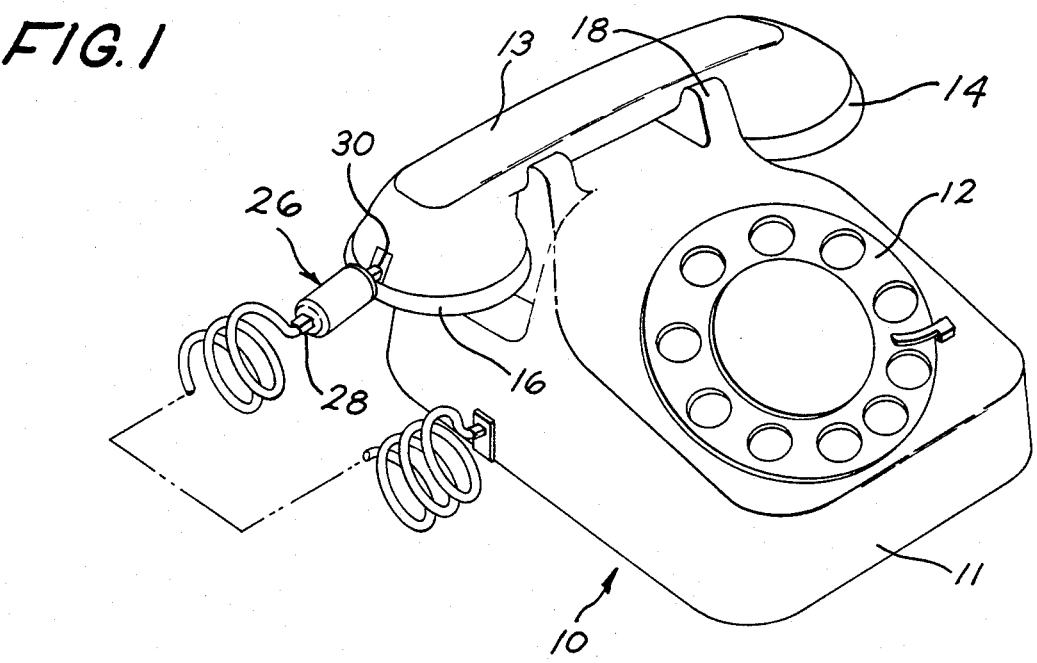
Figure 3:
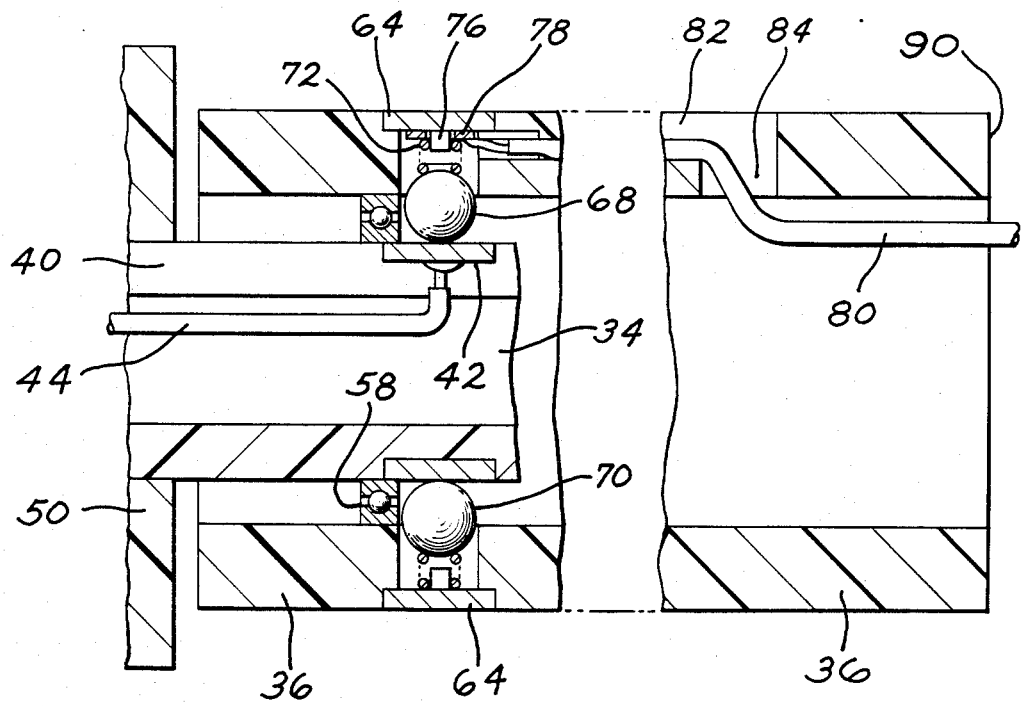
FIG. 3 is a fragmentary cross-sectional view, on an enlarged scale, through the center of the connector and showing the details of one of the electrical circuits through the connector between the inner and outer telescopic members, as well as showing the ball bearing member that supports the outer member on the inner member.

Turning now to a consideration of the drawings, and, in particular, to the top perspective view of FIG. 1, there is shown a typical example of a telephone set 10 as for use on a table or desk top. This telephone set 10 has a base 11 which includes the detailing mechanism 12. Separate from the base is a handset 13 having an earpiece 14 at one end and a microphone 16 at the opposite end. This handset is shown resting in a cradle 18 when not in use. The handset 13 is joined electrically to the base 11 by means of a coiled telephone cord 20, as is conventional in this art. One of the main advantages of using coiled telephone cords is that they are stretchable to lengths several times greater than their normal, unextended length. Also, when the handset 13 is in its rest mode, the telephone cord 20 is of its shortest length. One generally uniform disadvantage of the use of coiled telephone cords is that they become twisted and knotted-up until they reach a condition where they will not expand as originally designed, and such cords become an annoyance rather than a convenience.

Figure 6:
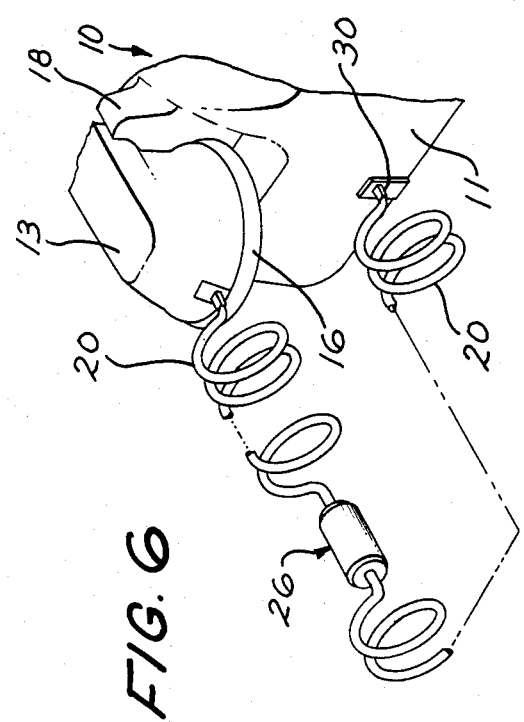
FIG. 6 is a small perspective view, similar to that of FIG. 5 but showing the connector of the present invention mounted intermediate the length of the telephone cord.
Figure 5:
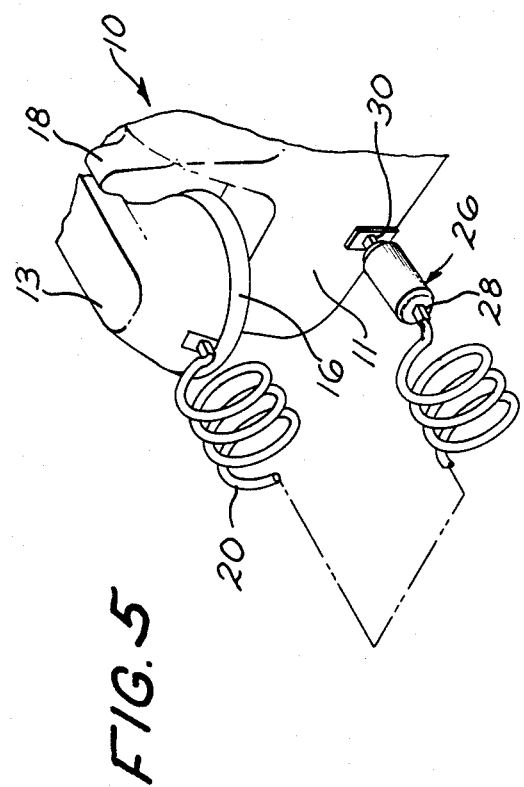
FIG. 5 is a small perspective view, similar to that of FIG. 1 but on a reduced scale, showing the connector of the present invention mounted to the base of the telephone set.

The present invention relates to the discovery of a low friction rotatable electrical connector 26 for joining with the coiled telephone cord 20 by being connected at one end 28 to the end of the cord 20, while being connected at its other end 30 to the microphone end 16 of the handset 13. Of course, there are two other options for locations to mount this rotatable connector 26, and these are shown in FIGS. 5 and 6. In FIG. 5, the rotatable connector 26 has its end 30 mounted directly to the telephone base 11, while the end 28 of the connector is joined to the end of the telephone cord 20.

In FIG. 6, the rotatable connector 26 of the present invention is shown mounted intermediate the length of the telephone cord 20.

Figure 2:
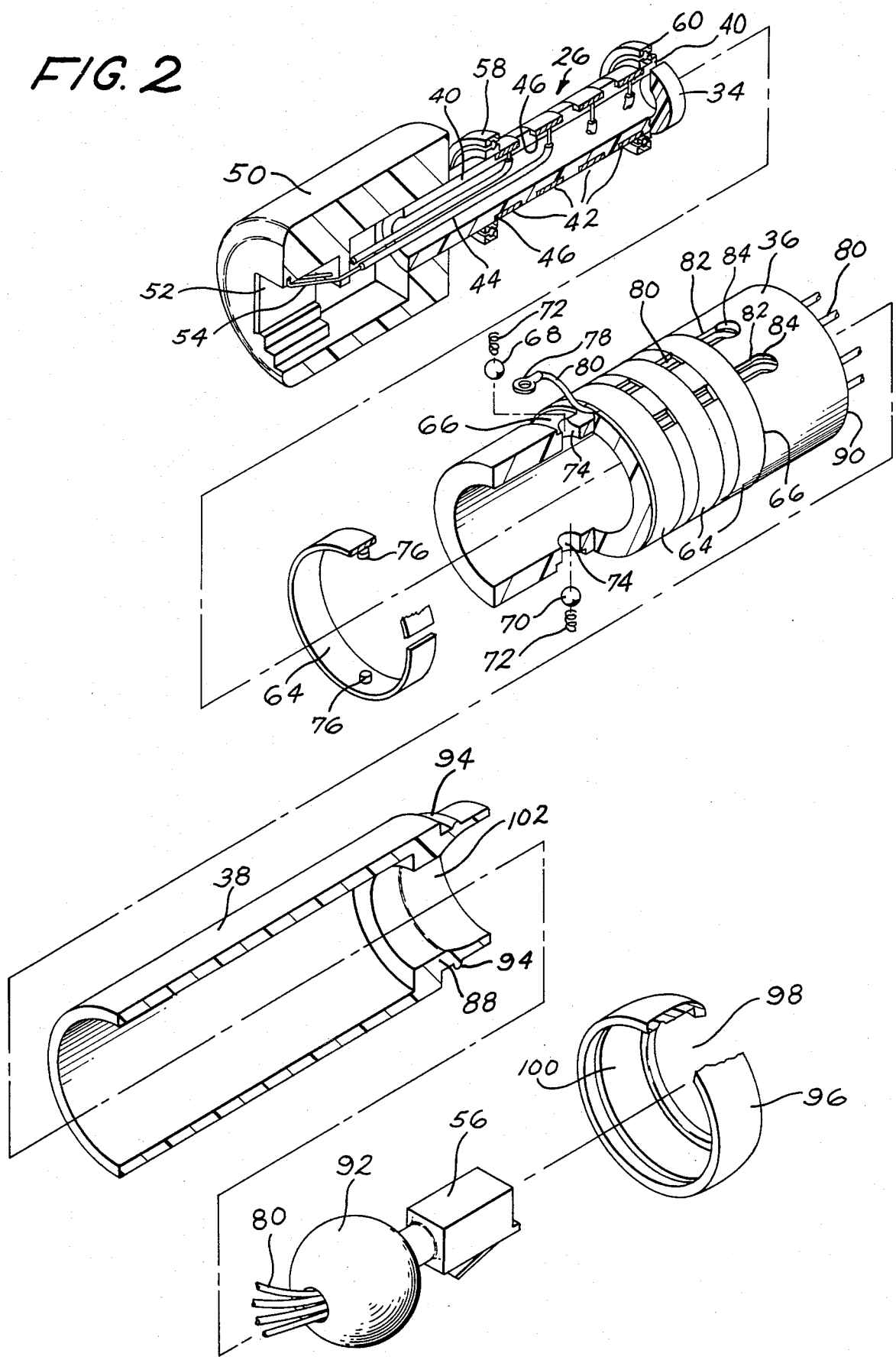
FIG. 2 is an exploded perspective view, on an enlarged scale, showing the low friction rotatable electrical connector separated into its individual parts and arranged in the manner in which they are joined together, where the hollow inner cylindrical member is illustrated at the top of the figure, the hollow outer cylindrical member is illustrated below that, and the outer insulated sleeve is illustrated below that, and finally the hollow ball and socket joint that supports the male electrical plug is illustrated at the bottom of the figure.

The construction of this low friction rotatable electrical connector 26 of the present invention can best be understood from the exploded perspective view of FIG. 2. There are three main elements; namely, a hollow inner cylindrical member 34 of insulating material, a hollow outer cylindrical member 36 of insulating material which is telescoped over the inner member 34, and an insulated sleeve 38 which telescopes over the outer member 36.

The hollow inner cylindrical member 34 has a single split 40 which extends from one end to the other of this member, and it is illustrated in FIG. 2 at the top of the member 34, and this FIG. 2 is taken on a vertical plane that extends through this single split 40. The purpose of this split 40 is so that the hollow inner cylindrical member 34 may be slightly compressed for receiving thereover a series of four continuous conductive rings 42 of copper material or the like. These rings would be slid onto the inner member 34 from one end, and they would be spaced from each other a slight amount so that they do not touch. Each copper ring 42 has soldered thereto a flexible insulated conductor 44, and these conductors extend through the single split 40 in the wall of the inner member and extend longitudinally through the inner member and exit from the left end of the inner member, as is seen in FIG. 2. Notice that slight annular recesses 46 are formed in the outer wall of the inner member 34 for receiving one of the copper rings 42 therein so that the outer surfaces of these rings are flush with the outer surface of the inner member 34.

Assembled on the left end of the inner cylindrical member 34 is a female electrical socket 50, again of insulating material, and it has an end cavity 52 fitted with a series of four, generally parallel, separate electrical contacts or terminals 54 of standard construction for receiving the standard male plug that is furnished with coiled telephone cords 20 on the market today. Such a standard male plug would be located at the end 28 of the cord 20, as shown in FIG. 1, and it would also be located at the other end 30 of the connector 26 of FIG. 1. The fact is that the male plug at 28 in FIG. 1 is fixed to the end of the telephone cord 20, while the male plug at the end 30 of FIG. 1 is carried by the connector 26 of the present invention. Turning to the assembly view of FIG. 4, a standard male plug 56 is shown on the right end of this rotatable connector 26 for fitting into the end of the handset 13 in FIG. 1. Each of the four flexible insulating conductors 44 is soldered to one of the electrical contacts or terminals 54 within the end cavity 52.

The female electrical plug 50 is a separate member from the hollow inner cylindrical member 34, but the female plug 50 is assembled to the left end of the inner member 34 and held in place thereon by friction, or other means. A pair of ball bearing raceway members 58 and 60 are also slid onto the end of the inner member 34 and widely spaced from each other so that each is adjacent the endmost copper ring 42.

Figure 4:
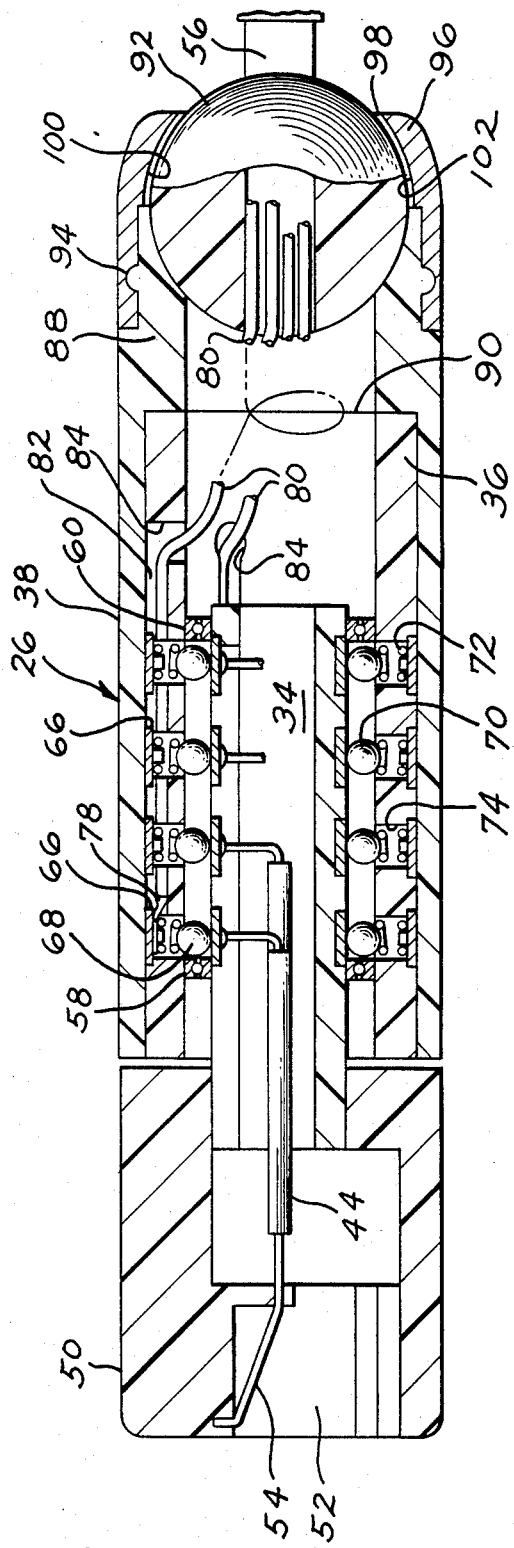
FIG. 4 is a cross-sectional assembly view of the rotatable electrical connector of the present invention taken through the center of the connector and shown on a scale larger than the scale of FIG. 2.

Next to be discussed is the design of the hollow outer cylindrical member 36 that is adapted to telescope over the inner member 34 and is adapted to be rotatably supported from the inner member by the pair of low friction ball bearing members 58 and 60, as is best seen in the cross-sectional assembly view of FIG. 4. Mounted on the exterior surface of the outer cylindrical member 36 is a series of four split conductive rings 64 of copper, or the like, which are adapted to be aligned and concentric with the four continuous conductive rings 42 mounted on the inner member 34. These split rings 64 are split for ease of assembling them to the outside of the outer member 36. Annular recesses 66 are formed in the exterior surface of the outer member for receiving the split rings 64 therein, so that the exterior surfaces of these split rings 64 are flush with the exterior peripheral surface of the outer member 36, as is best seen in the assembly view of FIG. 4. Now it is necessary to provide a continuous electrical circuit means between the continuous copper rings 42 and the split copper rings 64. At least two spring-biased metal balls 68 and 70 are provided to operate between the concentric continuous ring 42 and the overlying split ring 64, as is best seen in the assembly view of FIG. 4. Each metal ball is furnished with a small helical compression spring 72. In order to accommodate each ball and spring, an aperture 74 is formed through the wall of the hollow outer member 36 so that the apertures are generally diametrically opposed to each other. These apertures 74 are also positioned within the recesses 66 so that they underlie the split rings 64 as well as overlie the continuous rings 42 of the inner member 34. Looking at the single split ring 64 in FIG. 2 that is separated to the left from the outer member 36, it will be understood that on the interior surface of this split ring a pair of diametrically opposed pins 76 are formed thereon, and these pins are of such a size that they fit within the end of the helical spring 72 for serving as a spring support means. In other words, the two pins 76 are aligned to fit within the apertures 74 in the recesses 66. Of course, the metal balls 68 and 70 are installed into the apertures, as well as the two springs 72, before the split ring 64 is assembled over the outer member 36. Another purpose for one of these pins 76 is to serve as a terminal means for receiving the eyelet terminal 78 that is crimped on the end of a flexible insulated conductor 80, as best seen in FIG. 2. This eyelet terminal 78 would be assembled on one of the pins 76 before the split ring 64 is assembled in the recess 66, and that same pin engages in one of the helical springs 72 bearing against the related metal ball. Thus, the spring 72 not only urges the metal ball in reliable rolling contact with the continuous ring 42 of the inner member, but it also ensures a good electrical connection between the spring and the eyelet terminal 78 as rotational movement occurs between the inner member 34 and the outer member 36.

Another modification is to use but a single aperture with a spring-biased contact member that is not necessarily a conductive ball. It could be a conductive brush; as for example a motor brush.

As is best seen in FIG. 2, longitudinal recesses 82 are formed in the exterior surface of the outer member 36, each for receiving one of the four insulated conductors 80 therein, so that these same conductors can be fed underneath the split conductive rings 64 in the assembled condition so as not to interfere with the smooth low friction rotational movement of this connector 26. Notice in FIG. 4, that the outer member 36 is longer than the inner member 34 at the right end thereof, so that the outer member extends beyond the inner member. An aperture 84 is formed through the wall of the outer member in the vicinity of the outermost end of each recess 82 so that these insulated conductors 80 are fed into the interior of the hollow outer member and extend from the end thereof, as best seen in FIG. 4. Interestingly enough, the presence of the spring-biased metal balls 68 and 70 in the assembled position as shown in FIG. 4 serves as an interlocking means between the inner cylindrical member 34 and the outer cylindrical member 36 due to the close proximity of the two ball bearing members 58 and 60 to the endmost rings 42, 64 and the related metal balls. If a force were applied tending to separate the outer member 36 from the inner member 34, the metal balls would be unable to slide off of the inner member due to the presence of the endmost ball bearing member 60, as seen in FIG. 4.

Means must be provided for protecting these four split rings 64, and this is furnished by an insulated sleeve 38, which was mentioned earlier. This sleeve is held in place by a forced fit so that it is removable for making repairs, but it will ordinarily remain in position and not become disassembled inadvertently.

This outer sleeve 38 has an outermost extension 88 which extends beyond the outermost end 90 of the outer member 36. The purpose of this outermost extension 88 is to accommodate a hollow ball and socket joint 92 on which is supported the standard male plug 56, as was mentioned above. Thus, the four flexible insulated conductors 80 extend out of the outer member 36 and through the hollow ball and socket joint 92 for termination with the male plug 56. Exterior threads 94 are formed on the outer end of the extension 88 of the sleeve 38 for receiving a threaded collar member 96 which has a central opening 98 and a semi-spherical socket for mating engagement with the hollow ball 92 for holding the ball in place and capable of rotational movement in a universal direction with very low friction between the moving parts. The interior throat 102 of the outermost extension 88 of the sleeve 38 also has a semi-spherical socket formation mating with the ball 92 to complement the semi-spherical socket formation 100 of the collar 96.

It should be understood that the use of this ball and socket joint 92 is only necessary when one end of the connector 26 is fixedly mounted to the handset 13, as shown in FIG. 1; or alternately when one end is fixedly mounted to the base of the telephone set, as shown in FIG. 5. The use of the ball and socket joint is not necessary when the connector 26 is mounted intermediate the length of the coiled cord 20, as shown in FIG. 6. In that event, the connector 26 would be furnished with a length of coiled telephone cord 20 at each end, and a male plug 56 would be furnished on the free end of each such length of cord.

Another possible modification would be to eliminate the female socket 50 at the left end of the inner cylindrical member 34 of FIG. 4, and to substitute a length of coiled cord 20, and to install a male plug 56 on the free end of this cord length.

Another possible modification would be to eliminate the ball and socket joint 92 at the right end of the connector of FIG. 4 and substitute a short length of coiled cord 20 for the joint, and to install a male plug 56 on the free end of this cord length.

Modifications of this invention will occur to those skilled in this art. Therefore, it is to be understood that this invention is not limited to the particular embodiments disclosed, but that it is intended to cover all modifications which are within the true spirit and scope of this invention as claimed.

What is claimed is:

1. A low friction rotatable electrical connector for use with telephone cords, said connector comprising:
   a. an insulated pair of rotatably interconnected elongated members, there being a hollow inner cylindrical member telescoped within a hollow outer cylindrical member;
   b. and a pair of widely spaced, low friction bearing means located on the inner cylindrical member adjacent the opposite ends thereof for supporting the outer cylindrical member therefrom for turning movement about a longitudinal central axis of the connector;
   c. the outer end of one rotatable member having a female electrical socket member, while the outer end of the other rotatable member has a male electrical plug member, each of said male and female members being adapted to make electrical connection with a separate set of electrical conductors;
   d. a plurality of continuous conductive rings mounted on the exterior of the inner cylindrical member and spaced along the length thereof, and a set of flexible insulated conductors located within the inner cylindrical member and joining each separate conductive ring to the one of the said male and female members that is on the outer end of the inner member;
   e. a plurality of split conductive rings mounted on the exterior of the outer cylindrical member to be generally aligned and concentric with the said continuous rings of the inner member, the wall of the outer member being provided with at least one aperture in alignment with each of the plurality of split rings, each aperture being provided with a spring-biased contact member that is in constant electrical contact with one of the said continuous rings of the inner member;
   f. the exterior of the outer member having a plurality of longitudinally extending slots, each slot receiving one of a set of flexible insulated conductors, where each conductor is connected at one end to one of the split rings and connected at its other end to the other of said male and female members that is on the outer end of the outer member;
   g. and an insulated sleeve fitted over the outer member and held thereon.

2. The invention as recited in claim 1 wherein there are at least two opposed aperture-mounted, spring-biased contact members in electrical contact with each continuous ring of the said inner member and where each said spring-biased contact member is a conductive ball.

3. A low friction rotatable electrical connector for use with telephone cords, said connector comprising:
   a. an insulated pair of rotatably interconnected elongated members, there being a hollow inner cylindrical member telescoped within a hollow outer cylindrical member;
   b. and a pair of widely spaced, low friction bearing means located on the inner cylindrical member adjacent the opposite ends thereof for supporting the outer cylindrical member therefrom for turning movement about a longitudinal central axis of the connector;
   c. the outer end of one rotatable member having a female electrical socket member, while the outer end of the other rotatable member has a male electrical plug member, each of said male and female members being adapted to make electrical connection with a separate set of electrical conductors;
   d. a plurality of continuous conductive rings mounted on the exterior of the inner cylindrical member and spaced along the length thereof, and a set of flexible insulated conductors located within the inner cylindrical member and joining each separate conductive ring to the one of the said male and female members that is on the outer end of the inner member;
   e. a plurality of split conductive rings mounted on the exterior of the outer cylindrical member to be generally aligned and concentric with the said continuous rings of the inner member, the wall of the outer member being provided with at least one aperture in alignment with each of a plurality of split rings, each aperture being provided with a spring-biased contact member that is in constant electrical contact with one of the said continuous rings of the inner member;
   f. the exterior of the outer member having a plurality of longitudinally extending slots, each slot receiving one of a set of flexible insulated conductors, where each conductor is connected at one end to one of the split rings and connected at its other end to the other of said male and female members that is on the outer end of the outer member;
   g. and an insulated sleeve fitted over the outer member and held thereon;
   h. wherein the said inner cylindrical member has a single longitudinal split so that it may be partially collapsed in a transverse direction for mounting the plurality of continuous conductive rings thereon, where the said set of flexible insulated conductors within the inner member are each fed through this longitudinal split for making electrical connection with the said continuous conductive rings.

4. The invention as recited in claim 3, wherein the said outer insulated sleeve has an outermost extension that is fitted with a hollow ball and socket joint that is interposed between the end of the two telescopic rotatable members and the adjacent one of the said male and female electrical members, whereby one set of insulated conductors extends out through the hollow ball so that this low friction rotatable connector is capable of preventing the telephone cord to which it is connected from becoming twisted and knotted-up.

5. The invention as recited in claim 4, wherein the said male electrical plug member is mounted adjacent to the ball and socket joint, while the female electrical socket member is fixedly mounted to the outermost end of the inner cylindrical member, and the said male plug and the female socket are sized to interlock with a mating female socket and a mating male plug respectively.

6. The invention as recited in claim 4, wherein the said ball and socket end of this rotatable electrical connector is adapted to be fixedly mounted to a telephone set, while the opposite end of this connector is adapted to be connected to one end of a coiled telephone cord.

7. The invention as recited in claim 3, wherein this rotatable electrical connector is adapted to be connected intermediate the length of a coiled telephone cord.

8. A low friction rotatable electrical connector for use with a coiled telephone cord to prevent the cord from becoming twisted and knotted-up, said connector comprising:
   a. an insulated pair of rotatably interconnected elongated members, there being a hollow inner cylindrical member telescoped within a hollow outer cylindrical member;
   b. and a pair of widely spaced low friction bearing means located between the inner and outer members so these inner and outer members may freely rotate with respect to each other about their common longitudinal axis;
   c. and electrical terminal means at each end of this rotatable connector for joining this connector to external electrical conductors;
   d. a plurality of continuous conductive rings mounted on the exterior of the inner cylindrical member and spaced along the length thereof, and a first set of flexible insulated conductors located within the inner cylindircal member and joining each conductive ring to the said electrical terminal means at the outer end of the inner member;
   e. a plurality of split conductive rings mounted on the exterior of the outer cylindrical member so as to be generally aligned and concentric with the said continuous conductive rings, the wall of the outer member being provided with aperture means interposed between each split ring and its aligned and concentric continuous ring, each aperture being provided with a spring-biased ball that is in low friction, electrical rolling contact with the related continuous ring of the inner member;
   f. the exterior of the outer member having a plurality of longitudinally extending slots, each slot receiving one of a second set of flexible insulated conductors that are each connected on one end to one of the split rings and connected at its other end to the electrical terminal means at the other end of the connector;
   g. and an insulated sleeve fitted over the outer member and held thereon.

9. The invention as reicted in claim 8, wherein the said inner cylindrical member has a single longitudinal split so that it may be partially collapsed for receiving the plurality of continuous conductive rings thereon, where the said flexible insulated conductors within the inner member extend through this split area for making electrical connection with the continuous conductive rings.

10. The invention as recited in claim 9, wherein the said pair of low friction bearing raceway means are ball bearing members, and the arrangement of the spring-biased balls are sandwiched between the two ball bearing members to serve as an interlocking means between the telescopic inner and outer cylindrical members so as to hold this connector together.

11. The invention as recited in claim 10, wherein the said electrical terminal means at the outermost end of the inner cylindrical member is a female electrical socket, and the electrical terminal means at the outermost end of the outer cylindrical member is a male electrical plug.

12. The invention as recited in claim 11, wherein the said outer insulated sleeve fitted over the outer members has an extension on its outermost end that is fitted wiith a hollow ball and socket joint that supports the said male plug.

13. The invention as recited in claim 2, wherein the said pair of widely spaced, low friction bearing means are ball bearing raceway members, and the said plurality of two opposed spring-biased balls for each set of aligned and concentric rings are sandwiched between the two ball bearing members to serve as an interlocking means between the telescopic inner and outer cylindrical members so as to hold this connector together.

* * * * *